United States Patent
Du et al.

(10) Patent No.: US 8,948,770 B2
(45) Date of Patent: Feb. 3, 2015

(54) CLUSTER HEAD ASSISTED METHOD FOR CONVERTING USER TERMINAL FROM D2D COMMUNICATION TO CELLULAR COMMUNICATION

(75) Inventors: Jinling Du, Shanghai (CN); Ting Zhou, Shanghai (CN); Jing Xu, Shanghai (CN); Zhenhong Li, Shanghai (CN); Haifeng Wang, Shanghai (CN)

(73) Assignee: Shanghai Research Center for Wireless Communications, Shanghai (CN)

( * ) Notice: Subject to any disclaimer, the term of this patent is extended or adjusted under 35 U.S.C. 154(b) by 0 days.

(21) Appl. No.: 14/234,873

(22) PCT Filed: Jan. 12, 2012

(86) PCT No.: PCT/CN2012/070260
§ 371 (c)(1),
(2), (4) Date: Jan. 24, 2014

(87) PCT Pub. No.: WO2013/013510
PCT Pub. Date: Jan. 31, 2013

(65) Prior Publication Data
US 2014/0179330 A1   Jun. 26, 2014

(30) Foreign Application Priority Data
Jul. 25, 2011   (CN) .......................... 2011 1 0208330

(51) Int. Cl.
*H04W 72/00*   (2009.01)
*H04W 74/08*   (2009.01)
(52) U.S. Cl.
CPC .............................. *H04W 74/0833* (2013.01)
USPC ........... 455/450; 455/443; 455/444; 455/448; 455/452.2; 455/456.2

(58) Field of Classification Search
CPC . H04W 76/02; H04W 74/08; H04W 74/0833; H04W 76/021; H04W 76/043
USPC ............ 370/329, 331–333; 455/62, 443, 444, 455/447, 448, 450, 452.2, 456.2, 464, 509
See application file for complete search history.

(56) References Cited

U.S. PATENT DOCUMENTS

| 2009/0059795 A1* | 3/2009 | Fonseca et al. ................ 370/236 |
| 2012/0015607 A1* | 1/2012 | Koskela et al. ................. 455/62 |
| 2012/0184306 A1* | 7/2012 | Zou et al. ....................... 455/458 |

FOREIGN PATENT DOCUMENTS

| CN | 101772199 A | 7/2010 |
| CN | 101873591 A | 10/2010 |
| CN | 102026307 A | 4/2011 |
| WO | WO2009018251 A1 | 2/2009 |

\* cited by examiner

*Primary Examiner* — Dinh P Nguyen
(74) *Attorney, Agent, or Firm* — Tianhua Gu; Global IP Services

(57) ABSTRACT

The present invention discloses a cluster head assisted method for converting a user terminal from device-to-device (D2D) communication to cellular communication. When quality of a D2D link between a user terminal and a cluster head is lower than a predetermined threshold, if the user terminal has to leave the cluster but still expects to continue an original the service, the user terminal performs cell search and random access, and establishes a radio resource control (RRC) connection with a target base station of a cellular network. Switching from D2D communication to cellular communication is implemented with the assistance of the cluster head, and a communication manner after the switching is provided. The present invention implements mobile switching from D2D communication in distributed cluster communication to cellular communication, which can reduce route search delay and save wireless resources.

6 Claims, 3 Drawing Sheets

CLUSTER HEAD ASSISTED METHOD FOR CONVERTING USER TERMINAL FROM D2D COMMUNICATION TO CELLULAR COMMUNICATION

CROSS REFERENCE TO RELATED PATENT APPLICATION

The present application is the US national stage of PCT/CN2012/070260 filed on Jan. 12, 2012, which claims the priority of the Chinese patent application No. 201110208330.6 filed on Jul. 25, 2011, which application is incorporated herein by reference.

BACKGROUND OF THE PRESENT INVENTION

1. Field of Invention

The present invention belongs to the field of mobile communications technologies, and relates to a cluster head assisted method for converting a user terminal from device-to-device (D2D) communication to cellular communication.

2. Description of Related Arts

D2D cluster communication refers to directly exchanging information among a group of neighboring terminals through direct links, which does not require conventional network (for example, a base station) transfer. As the terminals are mobile, the cluster communication technology needs to provide mobile support for the terminals, and the most fundamental support is mobile switching/conversion between D2D communication and cellular communication. For D2D cluster communication, mobile management is especially important because apart from mobile switching, there are also issues about cluster update and re-establishment, for example, a terminal joins a cluster or leaves a cluster. As a favorable supplement to regular wireless communications, D2D cluster communication does not need network transfer. The network herein includes any access point such as a base transceiver station (BTS), a NodeB, an eNodeB, and a site controller.

D2D cluster communication has two operating modes: one is cluster communication under centralized control of a base station, and the other is cluster communication under distributed control of a cluster head. In a communication process of the first operating mode, the base station controls and manages D2D cluster communication, and each D2D member keeps a cellular link connection with the base station to complete exchange of control signaling, and each member terminal completes data exchange through a D2D link. In a communication process of the second operating mode, the cluster head controls and manages intra-cluster signaling and data exchange of the cluster communication; in this mode, the cluster head and the base station keep a cellular link connection in a communication connected state, and exchange necessary control signaling such as synchronization signaling, access signaling, and resource allocation (re-allocation) signaling; a member terminal in the cluster keeps a D2D link connection with the cluster head, is managed and controlled by the cluster head, and has no cellular link with the base station. However, due to the mobility of the terminal, the cluster communication cannot continue unless it is updated, reestablished, or even switched to a cellular network. This is no doubt a great challenge to distributed and semi-distributed cluster communication.

As shown in FIG. 1, in D2D pair communication under centralized control of a base station, once the quality of a D2D link fails to meet a communication requirement, UE1 and UE2 in the D2D communication mode are converted to a cellular communication mode by means of the base station. The process is as follows: initially, UE1 and UE2 directly communicate with each other through a D2D link. UE1 and UE2 periodically detect and measure the quality of the D2D link; once the link quality is lower than a predetermined threshold (THRD1) within a period of time, UE1 and UE2 each send a request to the base station, hoping to be converted to the cellular communication mode. After receiving the switching request, the base station allocates wireless resources to UE1 and UE2, and then the base station forwards a response message to UE1 and UE2. Subsequently, UE1 and UE2 separately measure and calculate quality of a cellular link, and if the quality of the cellular link is higher than a predetermined threshold (THRD2), both UE1 and UE2 request releasing D2D resources. After that, the base station sends a D2D resource release response message to UE1 and UE2. Finally, UE1 and UE2 release the D2D resources, and are converted to the cellular communication mode. At this time, the switch process from D2D communication to cellular communication is finished. In this switch process, it is assumed that two D2D terminals belong to the same base station, and each D2D terminal is capable of exchanging control signaling with the base station. However, if it is D2D cluster communication involving a group of user terminals rather than D2D pair communication, this method consumes a large quantity of wireless resources and much control signaling. Moreover, this method does not apply to D2D cluster communication under distributed control either.

FIG. 2 shows a simplified process of S1-based handover procedure in a Long Term Evolution (LTE) system. First, if there is no X2 interface between two base stations, or a source base station has initiated switching to a specific base station through an S1 interface, S1 switching will be initiated. Then, the source base station sends switching request information to a source mobility management entity (MME) (Step 2), and the source MME forwards a relocation request to a target MME (Step 3). Then the target MME sends a "switching request" to a target base station (Step 4), and the target base station establishes resources (Step 5), and feeds back a "switching request response" to the target MME (Step 6); the target MME responds the relocation request to the source MME (Step 7). After that, the source MME sends a "switching command" to the source base station (Step 8), and the source base station forwards the switching command to the terminal (Step 9). Subsequently, the source base station sends "base station state transfer" to the source MME (Step 10). After the target base station receives the "MME state transfer" from the target MME (Step 11), the target base station receives "switching acknowledgment" information sent by the terminal (Step 12). After that, the target base station sends "switching notification" information to the target MME (Step 13). Immediately after that, the source MME and the target MME complete relocation (Step 14), and the source MME instructs the source base station to release resources (Step 15). Finally, a tracking area is updated, and switching is completed (Step 16). In an actual LTE switching process, the source base station further needs to forward data to the target base station to implement seamless switching.

In the cellular network switching in FIG. 2, the source base station selects a target base station to which the user terminal is handed over. However, in a D2D communication network under distributed control of a cluster head, the base station only has communication connection information of the cluster head, and does not know state information of other member terminals in the cluster, so the foregoing switching method is not applicable to seamless handover of a D2D cluster member from a D2D link to a cellular link.

In the prior art, most researches are based on D2D communication under centralized control of a base station. In a scenario of such centralized control, whether it is D2D pair or D2D cluster communication, the base station is in charge of managing the switch of the user terminal from D2D communication to cellular communication. However, for D2D cluster communication under distributed or semi-distributed control of a cluster head, except for the cluster head, other member terminals in the cluster lack dedicated channels connected to the base station; even if terminals belong to the same base station (for example, in FIG. 3, UE2 of the terminal and UE1 of the cluster head are located in a coverage area of the same base station), it is difficult to convert the terminals from D2D communication to cellular communication, and to convert terminals in different base stations (for example, in FIG. 3, UE2 moved to a coverage area of another base station and UE1 are located in coverage areas of different base stations) is even more difficult. Even if the switch between D2D communication and cellular communication can be implemented, it costs great signaling overhead and communication delay, which further decreases the system capacity and throughput and does harm to the advantage of D2D communication. Therefore, under the premise of reducing communication delay while still maintaining the quality of service (QoS) of the communication terminal, for the distributed cluster communication, mobile switching between D2D communication and cellular communication is an urgent problem to be solved.

SUMMARY OF THE PRESENT INVENTION

The technical problem to be solved by the present invention is to provide a cluster head assisted method for converting a user terminal from D2D communication to cellular communication, which implements mobile switching between D2D communication and cellular communication in distributed cluster communication.

To solve the foregoing technical problem, the present invention adopts the following technical solution.

A cluster head assisted method for converting a user terminal from D2D communication to cellular communication comprises following steps:

Step 1: if quality of a D2D link between a user terminal and a cluster head is lower than a predetermined threshold, the user terminal performing cell search and a random access process to access a network;

Step 2: the user terminal sending a switching request to the cluster head through a D2D link, where the switching request comprises an ID of a target base station to which the user terminal is going to access; and the cluster head sending the switching request to a serving base station through a cellular link;

where if the ID of the target base station to which the user terminal is going to access is the same as an ID of the serving base station where the cluster head belongs, indicating that the target base station to which the user terminal is going to access and the serving base station where the cluster head belongs are the same base station, the user terminal accesses the serving base station where the cluster head belongs, and establishes a radio resource control (RRC) connection with the serving base station; the serving base station replies a switching response message to the cluster head through the cellular link; and the cluster head sends switching response information to the user terminal through the D2D link; and if the ID of the target base station to which the user terminal is going to access is different from an ID of the serving base station where the cluster head belongs, the user terminal accesses the target base station, and establishes an RRC connection with the target base station; the serving base station forwards the switching request of the user terminal to the target base station, and the target base station replies a switching response message to the serving base station.

As an optimal solution of the present invention, in Step 2, while sending the switching response information to the user terminal through the D2D link, the cluster head compares a modulation and coding scheme $MCS_{UE1\text{-}eNodeB1}$ between the cluster head and the serving base station with a modulation and coding scheme $MCS_{D2D}$ between D2D links; if $MCS_{UE1\text{-}eNodeB1}$ is approximately equal to $MCS_{D2D}$, the cluster head broadcasts data to a D2D cluster and the serving base station; and if values, of $MCS_{UE1\text{-}eNodeB1}$ and $MCS_{D2D}$ are significantly different, the cluster head chooses parallel communication operations, that is, the cluster head performs D2D multicast in the D2D cluster, and performs cellular unicast with the serving base station.

As another optimal solution of the present invention, a specific process of the cluster head performing parallel communication operations when values of $MCS_{UE1\text{-}eNodeB1}$ and $MCS_{D2D}$ are significantly different is as follows:

first, the cluster head unicasts data to the serving base station through the cellular link; and at the same time, the cluster head continues to multicast data to other member terminals in the D2D cluster through D2D links; and secondly, if the cluster head and the user terminal belong to the same serving base station, the serving base station forwards data to the user terminal through a cellular link.

As still another optimal solution of the present invention, a specific process of the cluster head broadcasting data to the D2D cluster and the serving base station when $MCS_{UE1\text{-}eNodeB1}$ is approximately equal to $MCS_{D2D}$ is as follows:

first, the cluster head multicasts data, and the serving base station and other member terminals in the D2D cluster receive the data; and secondly, if the cluster head and the user terminal belong to the same serving base station, the serving base station forwards data to the user terminal through a cellular link.

As another optimal solution of the present invention, in Step 2, when the target base station that the user terminal is going to access is different from the serving base station, the serving base station forwards data to the target base station, and then the target base station forwards the data to the user terminal.

As still another optimal solution of the present invention, preconditions for implementing the cluster head assisted method for converting a user terminal from D2D communication to cellular communication are as follows:

(a) at an initial stage, all intra-cluster user terminals are in the D2D cluster under distributed control of the cluster head, and the cluster head is in charge of cluster management and keeps a connection with the base station;

(b) D2D members perform multicast data communication in the cluster; and (c) D2D communication uses uplink cellular resources in an orthogonal manner.

Beneficial effects of the present invention lie in that: the cluster head assisted method for converting a user terminal from D2D communication to cellular communication according to the present invention implements mobile switching between D2D communication and cellular communication in distributed cluster communication, which can reduce route search delay and save wireless resources.

DETAILED DESCRIPTION OF THE PREFERRED EMBODIMENTS

The present invention provides a method for converting a user terminal, which is in D2D cluster communication under centralized control of a cluster head, from D2D communication to cellular communication. When a user terminal leaves a cluster and expects to continue an original service, the terminal first performs cell search and random access, and determines a serving base station for cellular communication; then, the cluster head compares quality of a cellular link and quality of a D2D link, and determines a subsequent communication manner; if the quality of the cellular link and the quality of the D2D link are similar, the cluster head chooses to broadcast data; if the quality of the cellular link and the quality of the D2D link are significantly different, the cluster head multicasts data in the cluster and unicasts data in the cellular network.

The following further describes the specific implementation manner of the present invention in detail with reference to the accompanying drawings.

Embodiments

This embodiment provides a cluster head assisted method for converting a user terminal from D2D communication to cellular communication, and the method has the following assumptions:

(a) at an initial stage, all intra-cluster user terminals are in a D2D cluster under distributed control of a cluster head, and the cluster head is in charge of cluster management and keeps a connection with an eNodeB;

(b) D2D terminals perform multicast data communication in the cluster; and (c) D2D communication uses uplink cellular resources in an orthogonal manner.

Based on the foregoing assumptions, the present invention provides a cluster head assisted method for converting a user terminal from D2D communication to cellular communication, which means that in D2D cluster communication under distributed control of a cluster head, a lossless switching method for rapidly converting a user terminal that leaves the cluster to cellular communication is provided.

Figure 1:
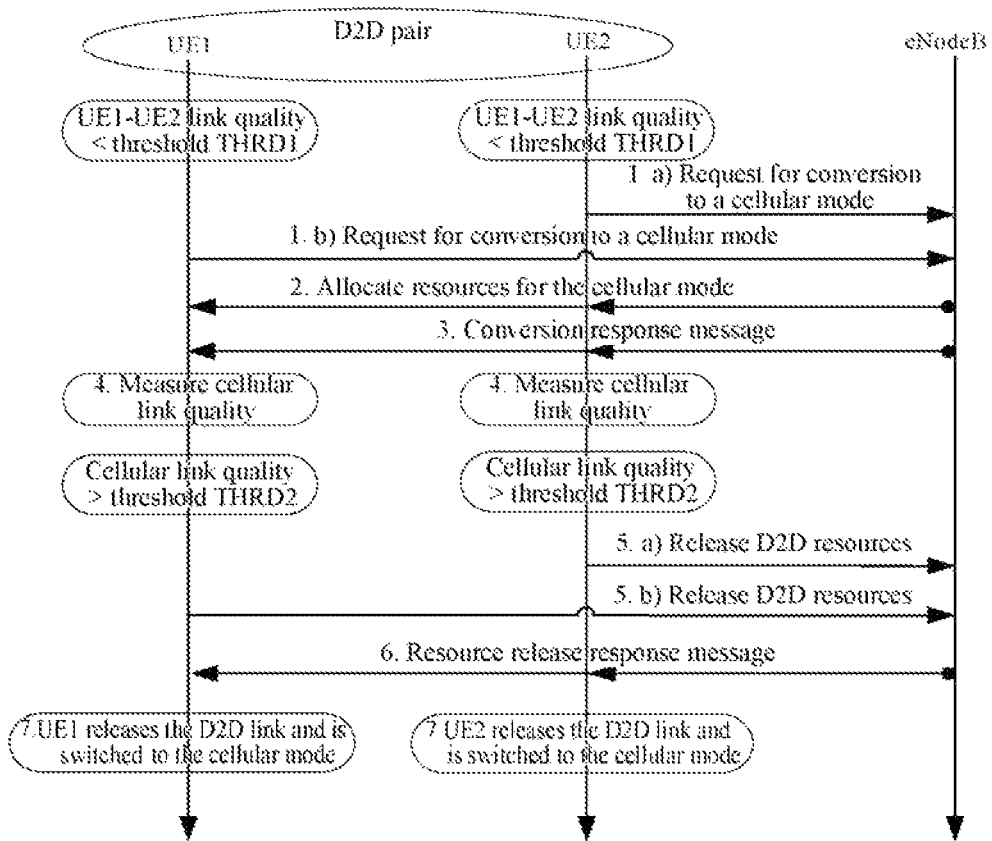
FIG. 1 is a schematic flowchart of a method for switching from a D2D communication mode under centralized control of a base station to a cellular communication mode.
Figure 2:
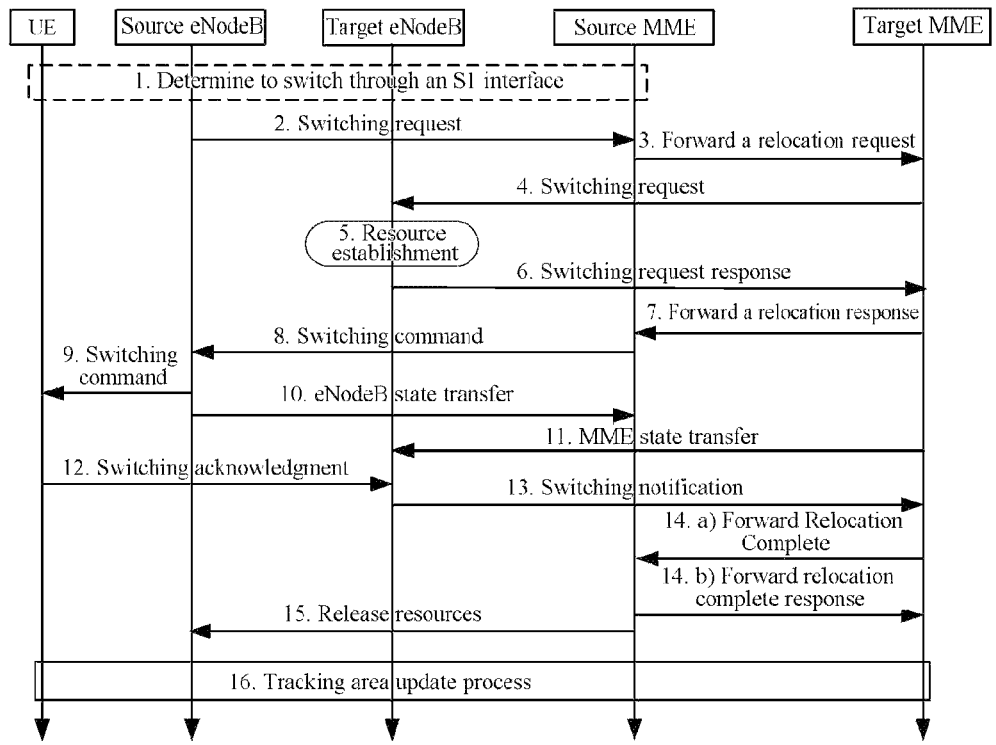
FIG. 2 is a schematic flowchart of an S1 interface switching method of an LTE system.
Figure 3:
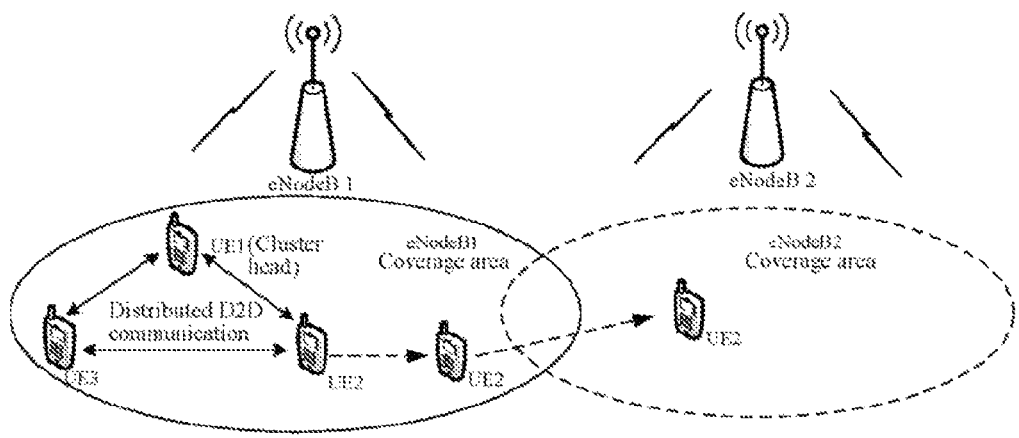
FIG. 3 is a schematic view of a scenario of movement of a terminal in D2D cluster communication.

As shown in FIG. 3, in a D2D cluster, terminals UE1, UE2, and UE3 directly exchange information through D2D links without transfer of a base station. The cluster head UE1 is connected to the base station, and manages and maintains communication in the cluster. In addition, UE1 is also a data source. In this case, if the user terminal UE2 in the cluster leaves the D2D cluster but still hopes to keep a current service, a most direct manner is that if quality of a link between terminals renders UE2 no longer suitable for D2D communication, the terminal UE2 is handed over to a cellular network to complete subsequent communication.

Based on the scenario and assumptions shown in FIG. 3, a specific implementation manner of the cluster head assisted method for converting a user terminal from D2D communication to cellular communication according to this embodiment is as follows:

(1) At an initial stage, UE1, UE2, and UE3 are in a D2D cluster, and the cluster head UE1 is a data source.

If quality of a D2D link between the user terminal UE2 and the cluster head UE1 in the cluster is lower than a predetermined threshold, the terminal UE2 performs cell search and a random access process to access a cellular network; the threshold is determined depending on an actual communication environment, for example, different communication services have different QoS requirements, and the threshold may be set according to the QoS.

If an ID of a base station to which the user terminal UE2 is going to access is the same as an ID of a base station where the cluster head UE1 belongs, that is, the user terminal UE2 can access the serving base station eNodeB1, and establish an RRC connection with eNodeB1.

If an ID of a target base station (eNodeB2) to which the user terminal UE2 is going to access is different from that of a serving base station (eNodeB1) where the cluster head UE1 belongs, the user terminal UE2 accesses the base station eNodeB2, and establishes an RRC connection with eNodeB2.

(2) The user terminal UE2 sends a switching request to the cluster head UE1 through a D2D link, and expects to keep an original service, where the switching request includes an ID of a target base station to which the user terminal UE2 is going to access.

This is different from a switching process of a conventional network (for example, the LTE1 network shown in FIG. 3); the source base station does not search for and determine the base station to which the UE is handed over; instead, the UE itself searches for and accesses the target base station, and notifies the cluster head of the ID of the target base station.

(3) The cluster head UE1 (which is not the base station) sends the switching request to the base station eNodeB1 through a cellular link.

(4) After receiving information of the switching request sent by the cluster head, the base station eNodeB1 learns which base station the user terminal UE2 accesses.

If the base station to which the user terminal UE2 is going to access is eNodeB1, the process skips to Step (5).

If the base station to which the user terminal UE2 is going to access is the target base station eNodeB2 which is different from the serving base stationeNodeB1, Step (4*) is performed.

(4*) The base station eNodeB1 forwards, to eNodeB2, request information for converting UE2 to cellular communication; if eNodeB2 receives the switching request forwarded by eNodeB1, eNodeB2 replies a switching response message to eNodeB1.

(5) The base station eNodeB1 replies a switching response message to the cluster head UE1 through the cellular link.

(6) The cluster head UE1 sends switching response information to the user terminal UE2 through a D2D link. At the same time, the cluster head UE1 compares a modulation and coding scheme $MCS_{UE1\text{-}eNodeB1}$ between UE1 and eNodeB1 with a modulation and coding scheme $MCS_{D2D}$ between D2D links; if $MCS_{UE1\text{-}eNodeB1}$ is approximately equal to $MCS_{D2D}$, the process skips to Step (7*); otherwise, the process proceeds to Step (7).

(7) If values of $MCS_{UE1\text{-}eNodeB1}$ and $MCS_{D2D}$ are significantly different, the cluster head UE1 chooses parallel communication operations; the cluster head UE1 performs D2D multicast in the cluster, and the cluster head UE1 performs cellular unicast with the base station eNodeB1. As is known to all, transmission efficiency of a D2D link is better than that of a regular cellular link. Based on this, in one aspect, user terminals in the D2D cluster can meet an original service requirement by applying the parallel communication operations; in another aspect, reliability of the unicast communication on the cellular link can also be ensured. The process of the parallel communication operations is as follows:

first, the cluster head UE1 unicasts data to the base station eNodeB1 through the cellular link; at the same time, the cluster head UE1 continues to multicast data to other member terminals in the cluster through D2D links; and secondly, if the cluster head UE1 and the user terminal UE2 belong to the same base station eNodeB1, the base station eNodeB1 forwards data to the user terminal UE2 through a cellular link; otherwise, the base station eNodeB1 forwards data to the base station eNodeB2, and then eNodeB2 forwards the data to the user terminal UE2.

(7*) If $MCS_{UE1\text{-}eNodeB1}$ is approximately equal to $MCS_{D2D}$, the cluster head UE1 broadcasts data to the D2D cluster and the base station eNodeB1, so as to save wireless resources, and the specific broadcast process is as follows:

first, the cluster head UE1 broadcasts data, and the serving base station eNodeB1 and other member terminals of the D2D cluster receive the data; and secondly, if the cluster head UE1 and the user terminal UE2 belong to the same base station eNodeB1, the eNodeB1 forwards a data packet, through the cellular link, to the user terminal UE2 that leaves the cluster; otherwise, the serving base station eNodeB1 forwards data to the target base station eNodeB2, and then the target base station eNodeB2 forwards the data to the terminal UE2 that leaves the cluster.

Figure 4:
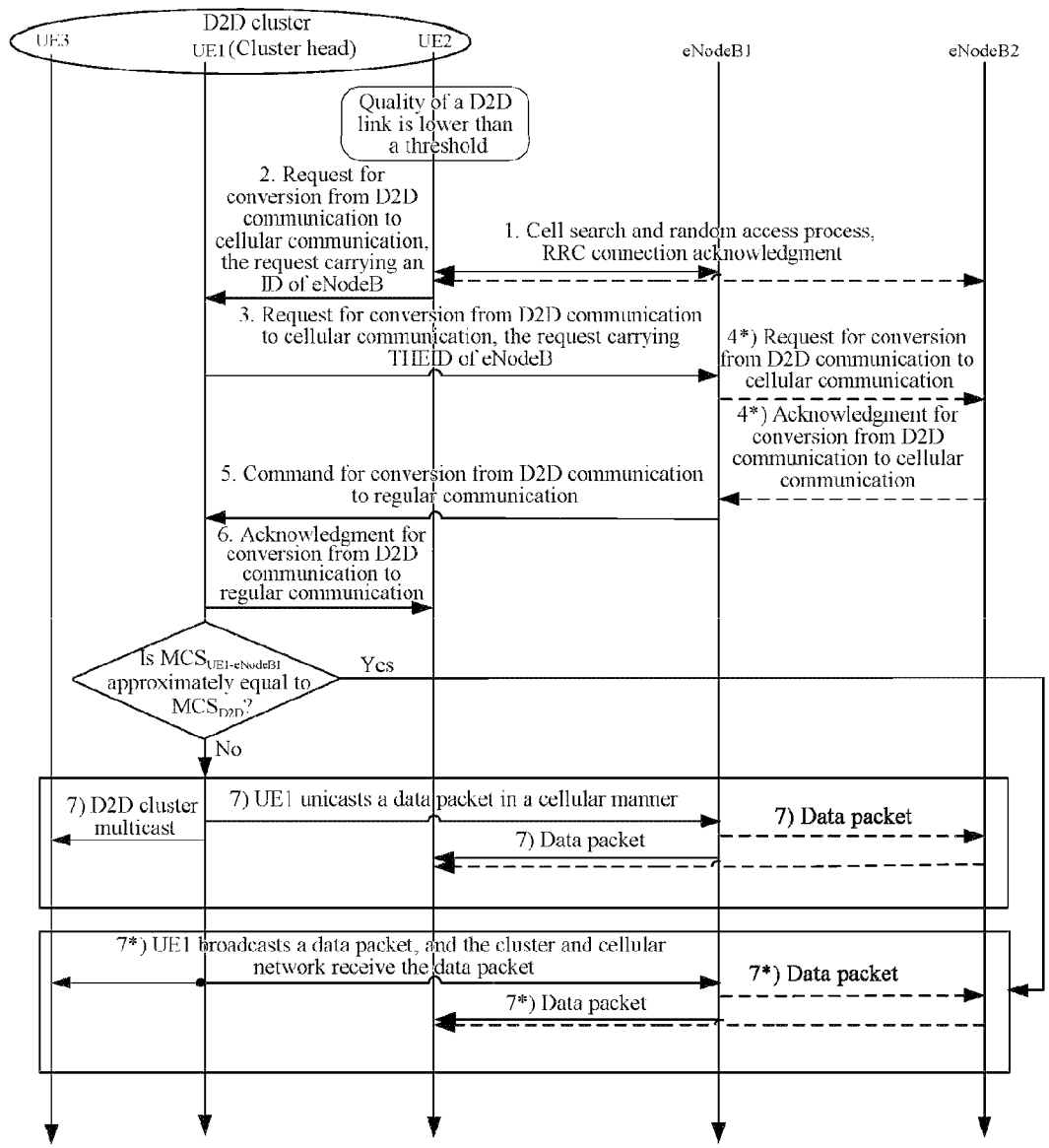
FIG. 4 is a schematic flowchart of a cluster head assisted method for converting a user terminal from D2D communication to cellular communication according to the present invention.

It should be noted that to simplify description, the data source and the cluster head are the same terminal in FIG. 4. In fact, even if the data source is not the cluster head, the foregoing process and method are also applicable.

The cluster head assisted method for converting a user terminal from D2D communication to cellular communication is applicable to D2D cluster communication under distributed and semi-distributed control of a cluster head, which implements seamless switching of a mobile terminal, which is in D2D cluster communication, from D2D communication to cellular communication. The main content is as follows:

1) A terminal in a D2D cluster sends an ID of a target base station to be accessed to a cluster head. When a certain D2D user terminal is going to be converted to a cellular communication mode, the user terminal sends information about the ID of the target base station to be accessed to the cluster head, and the cluster head forwards the information to its serving base station.

2) If a communication terminal that leaves the D2D cluster wants to continue an original service, the cluster head may determine a communication manner according to modulation and coding scheme (MCS) information. If a D2D MCS is approximately equal to an MCS of a cellular link, a broadcast manner is adopted; otherwise, a parallel manner is adopted. In the broadcast manner, the cluster head broadcasts data to other user terminals in the D2D cluster and a serving base station where the cluster head belongs. In the parallel manner, in one aspect, the cluster head performs intra-cluster multicast by using a dedicated resource, and in another aspect, the cluster head performs cellular unicast by using another resource, and sends data to a network (the serving base station) where the cluster head belongs. For cellular communication, if the serving base station of the cluster head is the same as the target base station selected by the user terminal that leaves the cluster, the base station directly forwards data to the user terminal that leaves; otherwise, data is forwarded between base stations, and is finally sent to the user terminal that leaves.

The description and application of the present invention are illustrative but are not intended to limit the scope of the present invention to the foregoing embodiments. Variations and changes to the embodiments disclosed herein are possible, and replacement of the embodiments and various equivalent components are well known to those of ordinary skills in the art. It should be clear to a person skilled in the art that without departing from the spirit or substantive features of the present invention, the present invention can be implemented in other forms, structures, arrangements, and proportions, and by using other elements, materials, and components.

What is claimed is:

1. A cluster head assisted method for converting a user terminal from device-to-device (D2D) communication to cellular communication, comprising following steps:

Step 1: determining of the quality of a D2D link between a user terminal and a cluster head is lower than a predetermined threshold, the user terminal performing cell search and a random access process to access a cellular network; and Step 2: the user terminal sending a switching request to the cluster head through a D2D link, wherein the switching request comprises an ID of a target base station to which the user terminal is going to access; and the cluster head sending the switching request to a serving base station through a cellular link, wherein the ID of the target base station to which the user terminal is going to access is the same as an ID of the serving base station where the cluster head belongs, indicating that the target base station to which the user terminal is going to access and the serving base station where the cluster head belongs are the same base station, the user terminal accesses the serving base station where the cluster head belongs, and establishes a radio resource control (RRC) connection with the serving base station;

the serving base station replies a switching response message to the cluster head through the cellular link; and the cluster head sends switching response information to the user terminal through the D2D link; and determining of the ID of the target base station to which the user terminal is going to access is different from an ID of the serving base station where the cluster head belongs, the user terminal accesses the target base station, and establishes an RRC connection with the target base station;

the serving base station forwards the switching request of the user terminal to the target base station, and the target base station replies a switching response message to the serving base station.

2. The cluster head assisted method for converting a user terminal from D2D communication to cellular communication according to claim 1, wherein in Step 2, while sending the switching response information to the user terminal through the D2D link, the cluster head compares a modulation and coding scheme MCS.sub.UE1-eNodeB1 between the cluster head and the serving base station with a modulation and coding scheme MCS.sub.D2D between D2D links; determining of MCS.sub.UE1-eNodeB1 is approximately equal to MCS.sub.D2D, the cluster head broadcasts data to a D2D cluster and the serving base station; and determining of values of MCS.sub.UE1-eNodeB1 and MCS.sub.D2D are significantly different, the cluster head chooses parallel communication operations, that is, the cluster head performs D2D multicast in the D2D cluster, and performs cellular unicast with the serving base station.

3. The cluster head assisted method for converting a user terminal from D2D communication to cellular communication according to claim 2, wherein a specific process of the cluster head performing parallel communication operations when values of $MCS_{UE1\text{-}eNodeB1}$ and $MCS_{D2D}$ are significantly different is: first, the cluster head unicasting data to the serving base station through the cellular link; and at the same time, the cluster head continuing to multicast data to other member terminals in the D2D cluster through D2D links; and secondly, if the cluster head and the user terminal belong to the same serving base station, the serving base station forwarding data to the user terminal through the cellular link.

4. The cluster head assisted method for converting a user terminal from D2D communication to cellular communication according to claim 3, wherein a specific process of the cluster head broadcasting data to the D2D cluster and the serving base station when $MCS_{UE1\text{-}eNodeB1}$ is approximately equal to $MCS_{D2D}$ is: first, the cluster head multicasting data, and the serving base station and other member terminals in the D2D cluster receiving the data; and secondly, if the cluster head and the user terminal belong to the same serving base station, the serving base station forwarding data to the user terminal through the cellular link.

5. The cluster head assisted method for converting a user terminal from D2D communication to cellular communication according to claim 1, wherein in Step 2, when the target base station that the user terminal is going to access is different from the serving base station, the serving base station forwards data to the target base station, and then the target base station forwards the data to the user terminal.

6. The cluster head assisted method for converting a user terminal from D2D communication to cellular communication according to claim 1, wherein preconditions for implementing the cluster head assisted method for converting a user terminal from D2D communication to cellular communication are as follows: (a) at an initial stage, all intra-cluster user terminals are in the D2D cluster under distributed control of the cluster head, and the cluster head is in charge of managing and maintaining the cluster, and keeps a connection with the base station; (b) D2D user terminals perform multicast data communication in the cluster; and (c) D2D communication uses uplink cellular resources in an orthogonal manner.

\* \* \* \* \*